E. A. GAMBLE.
HARNESS ATTACHMENT.
APPLICATION FILED APR. 27, 1910.
979,067.
Patented Dec. 20, 1910.
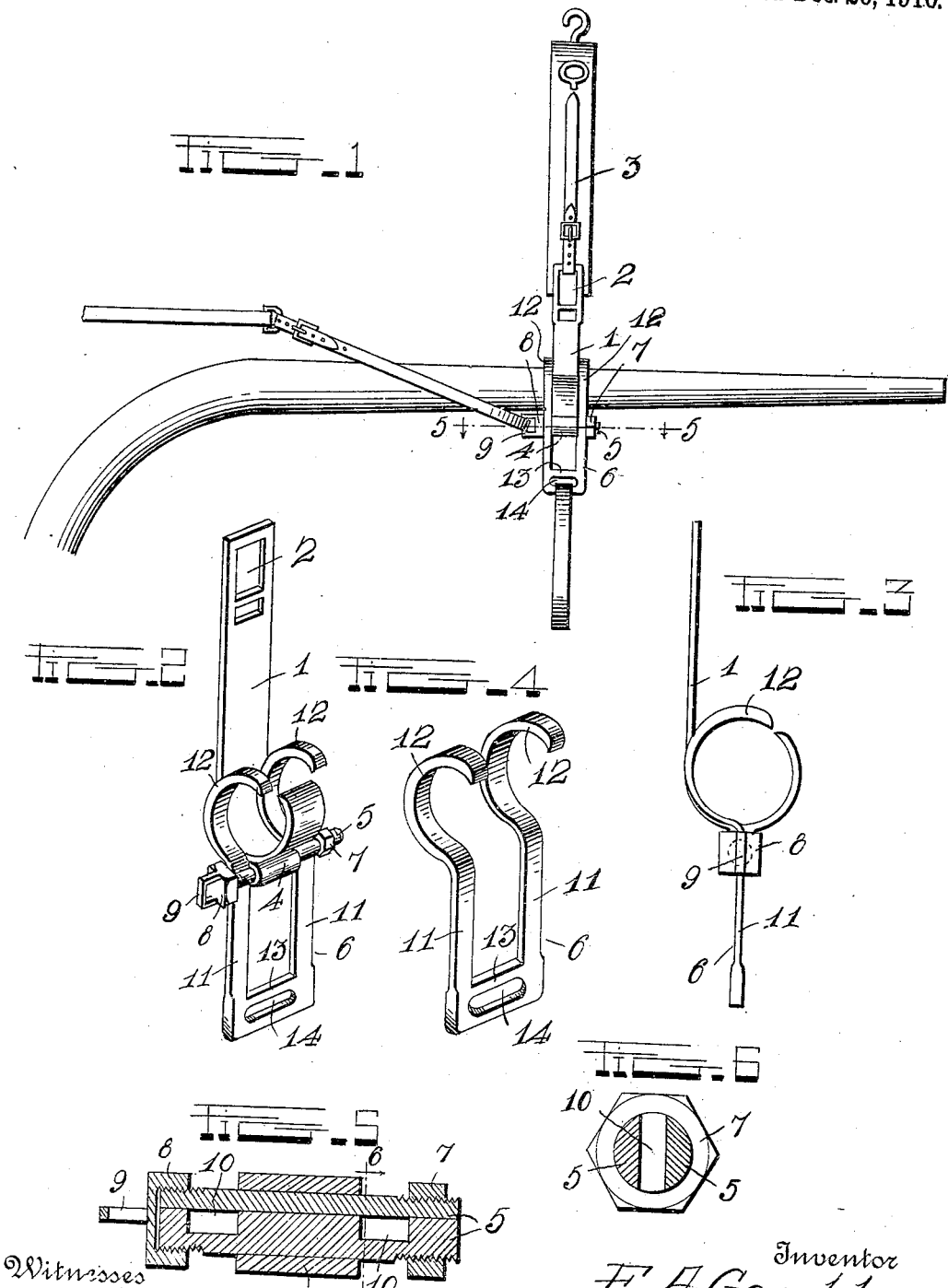

UNITED STATES PATENT OFFICE.

EDWARD A. GAMBLE, OF HASTINGS, NEBRASKA.

HARNESS ATTACHMENT.

979,067.

Specification of Letters Patent.   Patented Dec. 20, 1910.

Application filed April 27, 1910.   Serial No. 557,854.

*To all whom it may concern:*

Be it known that I, EDWARD A. GAMBLE, a citizen of the United States, residing at Hastings, in the county of Adams and State of Nebraska, have invented certain new and useful Improvements in Harness Attachments; and I do declare the following to be a full, clear, and exact description of the invention, such as will enable others skilled in the art to which it appertains to make and use the same.

This invention relates to thill or shaft supporting and attaching devices for harness.

The object of the invention is to provide an improved shaft supporting device which may be quickly and easily engaged with the thills or shafts whereby they are supported and held down in proper position, means being provided for the connection of the breeching strap with the attachment thus dispensing with the usual wrapping of said strap around the shaft.

With this and other objects in view the invention consists of certain novel features of construction, combination and arrangement of parts as will be more fully described and particularly pointed out in the appended claims.

In the accompanying drawings: Figure 1 is a side view of a portion of a harness and a thill or shaft showing the application of the invention; Fig. 2 is an enlarged perspective view of the attachment; Fig. 3 is an end view of the same showing the pivotal shaft engaging hook in operative position; Fig. 4 is detail perspective view of the pivoted member of the device. Fig. 5 is a detail cross sectional view on the line 5—5 of Fig. 1. Fig. 6 is a detail sectional view on the line 6—6 of Fig. 5.

In the embodiment of the invention I provide a shaft supporting member 1 which is preferably constructed in the form of a flat metal hook having on its upper end a buckle 2 whereby the same is attached to the shaft supporting strap 3 of the harness saddle. On the lower end of the hook is formed a bearing eye 4 in which is loosely mounted the supporting bolt 5 for the shaft holding member 6.

The bolt 5 is in the form of two longitudinal sections which are threaded at each end and are secured together at one end by a nut 7 and at their opposite ends by a nut 8 on which is formed a strap loop or bail 9 the purpose of which will be hereinafter described. In the inner edge of one of the sections of the bolt adjacent to its outer ends are formed notches 10 said notches being closed by the inner side of the adjoining section of the bolt thus forming slots with which are loosely engaged the shaft holding member 6 of the device.

The shaft holding member 6 comprises a pair of bars 11 which are slidably engaged with the slots formed by the notches 10 in the bolt 5 and have formed on their upper ends shaft engaging hooks 12 said hooks being disposed on opposite sides of the shaft supporting hook 1, with which they are adapted to coact to firmly grip and hold the shafts down in position in the hook 1. The lower ends of the bars 11 are connected together by a cross plate 13 in which is formed a strap receiving slot 14. With the slot 14 is engaged a strap whereby the member 6 of the device is connected to the belly band of the harness.

In using the device it is simply necessary to swing the hooked upper ends of the shaft holding member 6 inwardly thus leaving the shaft supporting hook 1 free to be engaged with the shaft after which the member 6 is swung back and drawn downwardly thus engaging the hooks 12 with the upper side of the shaft thereby securely holding the latter in position and attaching the horse thereto. When the parts have been thus arranged the breeching strap may be engaged with the loop 9 on the nut 8 thus providing an efficient means for connecting said strap with the shaft.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a harness attachment of the character described, a shaft supporting hook adapted to be connected to the harness and to be engaged with the shafts whereby the latter are supported, a shaft holding member pivotally and slidably mounted with relation to said supporting hook and adapted to coöperate with said hook, to hold the shafts in position, a detachable slotted bolt connection between the supporting hook and shaft holding member, and means whereby said shaft holding member may be connected to the harness.

2. In a harness attachment a shaft supporting hook adapted to be connected to the harness saddle, a pair of shaft holding hooks, means to pivotally and slidably connect said hooks with the supporting hook, means to connect said shaft holding hooks with the belly band of the harness and means to connect the breeching strap of the harness with said attachment.

3. In an attachment of the character described, a shaft supporting hook having formed on its upper end a buckle whereby the same is detachably secured to the saddle strap of the harness, a bearing eye formed on the lower end of said supporting hook, a pivot bolt loosely mounted in said eye, said bolt having formed therein transverse slots, a pair of shaft holding hooks slidably mounted in the slots of said bolt and adapted to coact with said supporting hook to hold the shafts in position, a slotted cross plate to secure the lower end of said hooks together, said slotted plate being adapted to receive the belly band strap whereby the attachment is secured to the band and a strap loop secured to one end of said bolt and adapted to receive the breeching strap of the harness whereby said strap is secured to the attachment.

4. In a harness attachment of the character described, a shaft supporting hook, means to secure said hook to the harness saddle, a bearing eye formed on the lower end of said hook, a pivot bolt having a loose engagement with said eye, said bolt being formed in separable sections one of which is notched to provide slots through said bolt, nuts arranged on the opposite ends of said bolt to secure said sections together, a strap engaging loop formed on one of said nuts, and shaft holding hooks having sliding engagement with the slots in said bolt whereby said hooks are adapted to be engaged with the shafts to hold the latter in position in said supporting hook.

In testimony whereof I have hereunto set my hand in presence of two subscribing witnesses.

EDWARD A. GAMBLE.

Witnesses:
MABEL CRAMER,
A. H. CRAMER.